United States Patent
Oda et al.

(10) Patent No.: US 9,534,985 B2
(45) Date of Patent: Jan. 3, 2017

(54) FAULT DIAGNOSTIC SYSTEM FOR INTERNAL COMBUSTION ENGINE AND FAULT DIAGNOSTIC METHOD FOR INTERNAL COMBUSTION ENGINE

(71) Applicant: Toyota Jidosha Kabushiki Kaisha, Toyota-shi Aichi-ken (JP)

(72) Inventors: Yoshihisa Oda, Toyota (JP); Kenji Kimura, Toyota (JP); Hitoki Sugimoto, Toyota (JP); Toshitake Sasaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 13 days.

(21) Appl. No.: 14/525,915

(22) Filed: Oct. 28, 2014

(65) Prior Publication Data

US 2015/0127213 A1    May 7, 2015

(30) Foreign Application Priority Data

Nov. 1, 2013    (JP) .................................. 2013-228344

(51) Int. Cl.

| | |
|---|---|
| G01M 17/00 | (2006.01) |
| G06F 7/00 | (2006.01) |
| G06F 11/30 | (2006.01) |
| G06F 19/00 | (2011.01) |
| G07C 5/00 | (2006.01) |
| F01P 9/00 | (2006.01) |
| G01M 15/04 | (2006.01) |
| F01P 11/16 | (2006.01) |

(52) U.S. Cl.
CPC ............. *G01M 15/048* (2013.01); *F01P 11/16* (2013.01); *F01P 2025/13* (2013.01); *F01P 2025/30* (2013.01); *F01P 2025/34* (2013.01); *F01P 2060/16* (2013.01)

(58) Field of Classification Search
None
See application file for complete search history.

(56) References Cited

U.S. PATENT DOCUMENTS

| | | |
|---|---|---|
| 8,140,246 B1 | 3/2012 | Manchanda |
| 2004/0035194 A1* | 2/2004 | Wakahara .................... 73/118.1 |

(Continued)

FOREIGN PATENT DOCUMENTS

| | | |
|---|---|---|
| JP | 388130 U | 9/1991 |
| JP | H10-176534 A | 6/1998 |

(Continued)

*Primary Examiner* — Yonel Beaulieu
*Assistant Examiner* — Lail Kleinman
(74) *Attorney, Agent, or Firm* — Dinsmore & Shohl LLP

(57) ABSTRACT

A learning unit learns a difference between a detected value ECT and a detected value RCT when it is determined that the detected value ECT and detected value RCT are stable while an engine is at a stop. A diagnostic unit performs a fault diagnosis for the engine based on the difference between the detected value ECT and detected value RCT having been corrected through use of a learned value learned by the learning unit. Accordingly, a fault diagnostic system for an internal combustion engine and a fault diagnostic method for an internal combustion engine can be achieved in which accuracy in fault diagnosis for the internal combustion engine can be improved and an erroneous diagnosis can be restrained.

9 Claims, 9 Drawing Sheets

(56) References Cited

U.S. PATENT DOCUMENTS

2010/0095909 A1* 4/2010 Lin .................. F01P 11/16
                                                    123/41.02
2010/0138134 A1* 6/2010 Anilovich et al. ............ 701/102
2013/0058373 A1* 3/2013 Sakurada .................... 374/4

FOREIGN PATENT DOCUMENTS

| JP | 2000220454 A | 8/2000 |
| JP | 2004-339969 A | 12/2004 |
| JP | 2009-191743 A | 8/2009 |
| JP | 201392823 A | 5/2012 |
| JP | 2012092823 A | 5/2012 |

* cited by examiner

FAULT DIAGNOSTIC SYSTEM FOR INTERNAL COMBUSTION ENGINE AND FAULT DIAGNOSTIC METHOD FOR INTERNAL COMBUSTION ENGINE

This nonprovisional application is based on Japanese Patent Application No. 2013-228344 filed on Nov. 1, 2013 with the Japan Patent Office, the entire contents of which are hereby incorporated by reference.

BACKGROUND OF THE INVENTION

1. Field of the Invention

The present invention relates to a fault diagnostic system for an internal combustion engine and a fault diagnostic method for an internal combustion engine, and particularly relates to a fault diagnostic system for an internal combustion engine and a fault diagnostic method for an internal combustion engine in which a fault diagnosis for an internal combustion engine is performed based on the temperature of cooling water.

2. Description of the Background Art

An engine is known which includes a first water temperature sensor provided for a water jacket of the engine to detect an engine water temperature and a second water temperature sensor provided for a cooling water passage from a radiator to the engine to detect a radiator exit water temperature.

For example, Japanese Patent Laying-Open No. 2000-220454 discloses an engine in which a cooling fan is controlled based on the temperatures detected by the first water temperature sensor and the second water temperature sensor.

However, in the case of performing a fault diagnosis for an engine through use of the engine water temperature detected by the first water temperature sensor and the radiator exit water temperature detected by the second water temperature sensor, accuracy in fault diagnosis for the engine may be degraded if there is mismatch between detection characteristics of the first water temperature sensor and detection characteristics of the second water temperature sensor.

That is, if a detected value of the first water temperature sensor and a detected value of the second water temperature sensor are different even though the engine water temperature and the radiator exit water temperature are identical, accuracy in fault diagnosis for the engine will be degraded due to the difference in detection characteristics between the first water temperature sensor and the second water temperature sensor.

SUMMARY OF THE INVENTION

The present invention was made to solve the above-described problem, and has an object to provide a fault diagnostic system for an internal combustion engine and a fault diagnostic method for an internal combustion engine in which accuracy in fault diagnosis for the internal combustion engine can be improved and an erroneous diagnosis can be restrained.

According to the present invention, an internal combustion engine includes a cooling device having a radiator and a cooling water passage configured to circulate cooling water between the internal combustion engine and the radiator. A fault diagnostic system for an internal combustion engine includes a first cooling water temperature sensor, a second cooling water temperature sensor, a learning unit, and a diagnostic unit. The first cooling water temperature sensor detects a temperature of cooling water flowing in the internal combustion engine through the cooling water passage. The second cooling water temperature sensor detects a temperature of cooling water flowing in the radiator through the cooling water passage. The learning unit learns a difference between a detected value of the first cooling water temperature sensor and a detected value of the second cooling water temperature sensor when it is determined that the detected values of the first and second cooling water temperature sensors are stable while the internal combustion engine is at a stop. The diagnostic unit performs a fault diagnosis for the internal combustion engine based on a temperature difference between the water temperature detected by the first cooling water temperature sensor and the water temperature detected by the second cooling water temperature sensor having been corrected through use of a learned value learned by the learning unit.

When the detected values of the first and second cooling water temperature sensors are stable while the internal combustion engine is at a stop, the temperature of cooling water in the cooling water passage becomes uniform. On this occasion, mismatch in detection characteristics between the sensors can be corrected by learning the difference between the detected values of the first and second cooling water temperature sensors. Therefore, according to this fault diagnostic system, the detected water temperatures having been corrected through use of the learned value can be used to improve accuracy in fault diagnosis for the internal combustion engine and restrain an erroneous diagnosis.

Preferably, the learning unit does not execute learning if the difference between the detected value of the first cooling water temperature sensor and the detected value of the second cooling water temperature sensor is more than a predetermined value when it is determined that the detected values of the first and second cooling water temperature sensors are stable while the internal combustion engine is at a stop.

If the difference between the detected values is more than the predetermined value even though the detected values of the first and second cooling water temperature sensors are stable while the internal combustion engine is at a stop, there is a possibility that disturbance due to the use of a block heater or the like has occurred. If learning is executed in this case, the difference between the detected values will be erroneously learned. Therefore, learning is not executed, so that erroneous learning can be restrained.

Preferably, the predetermined value is a total value of a tolerance of the detected value of the first cooling water temperature sensor and a tolerance of the detected value of the second cooling water temperature sensor.

If the difference between the detected values is more than or equal to a total value of the tolerance of the detected value of the first cooling water temperature sensor and the tolerance of the detected value of the second cooling water temperature sensor when the detected values of the first and second cooling water temperature sensors are stable while the internal combustion engine is at a stop, the difference between the detected values has arisen for a reason other than mismatch in characteristics between the sensors. If learning is executed in this case, the difference between the detected values will be erroneously learned. Therefore, learning is not executed, so that erroneous learning can be reliably restrained.

Preferably, the diagnostic unit does not execute correction through use of the learned value if the difference between the detected value of the first cooling water temperature sensor and the detected value of the second cooling water temperature sensor is different from the learned value after completion of warming up of the internal combustion engine.

After the completion of warming up of the internal combustion engine, the temperature of cooling water flowing in the internal combustion engine and the temperature of cooling water flowing in the radiator are stable. If the difference between the detected value of the first cooling water temperature sensor and the detected value of the second cooling water temperature sensor after the completion of warming up of the internal combustion engine is different from the learned value, there is a high possibility that the learned value has been calculated erroneously due to disturbance. Thus, correction through use of the learned value is not executed. Accordingly, a fault of the internal combustion engine can be restrained from being diagnosed through use of detected values erroneously learned.

Preferably, the diagnostic unit does not execute correction through use of the learned value if the difference between the detected value of the first cooling water temperature sensor and the detected value of the second cooling water temperature sensor is different from the learned value when it is determined that the detected values of the first and second cooling water temperature sensors are stable in a state where the cooling water is circulating between the internal combustion engine and the radiator while the internal combustion engine is operating.

When it is determined that the detected values of the first and second cooling water temperature sensors are stable in a state where the cooling water is circulating between the internal combustion engine and the radiator while the internal combustion engine is operating, the difference between the detected values of the first and second cooling water temperature sensors is compared with the learned value assuming that warming up of the internal combustion engine has been completed. It is thereby possible to reliably detect that the learned value has been calculated erroneously due to disturbance.

Preferably, the diagnostic unit does not execute a fault diagnosis for the internal combustion engine if the difference between the detected value of the first cooling water temperature sensor and the detected value of the second cooling water temperature sensor is different from the learned value after completion of warming up of the internal combustion engine.

If the difference between the detected values of the first and second cooling water temperature sensors is different from the learned value when warming up of the internal combustion engine is completed, there is a high possibility that the learned value has been calculated erroneously due to disturbance. Thus, a fault diagnosis for the internal combustion engine is not executed. Accordingly, a fault of the internal combustion engine can be restrained from being diagnosed through use of detected values erroneously learned.

Preferably, the diagnostic unit does not execute a fault diagnosis for the internal combustion engine if the difference between the detected value of the first cooling water temperature sensor and the detected value of the second cooling water temperature sensor is different from the learned value when it is determined that the detected values of the first and second cooling water temperature sensors are stable in a state where the cooling water is circulating between the internal combustion engine and the radiator while the internal combustion engine is operating.

When it is determined that the detected values of the first and second cooling water temperature sensors are stable in a state where the cooling water is circulating between the internal combustion engine and the radiator while the internal combustion engine is operating, the difference between the detected values of the first and second cooling water temperature sensors is compared with the learned value assuming that warming up of the internal combustion engine has been completed. It is thereby possible to reliably detect that the learned value has been calculated erroneously due to disturbance.

Preferably, the cooling device further includes a radiator circulation passage configured to flow cooling water to the radiator, a return passage configured to flow returned cooling water from the internal combustion engine back to the internal combustion engine without passing through the radiator, a junction part configured such that the radiator circulation passage and the return passage join at an inlet side of the internal combustion engine, and a thermostat provided for the junction part and configured to adjust a mixing ratio between the cooling water flowing in the radiator circulation passage and the returned cooling water in accordance with the temperature of cooling water at the junction part. The diagnostic unit performs a fault diagnosis for the thermostat based on the temperature difference between the water temperature detected by the first cooling water temperature sensor and the water temperature detected by the second cooling water temperature sensor having been corrected through use of the learned value.

As an example of a fault diagnosis for the thermostat, it can be determined that the thermostat has failed when the temperature difference between the water temperature detected by the first cooling water temperature sensor and the water temperature detected by the second cooling water temperature sensor is small in the case where the temperature of cooling water is a temperature at which the valve of the thermostat is closed. By correcting, through use of the learned value, the water temperature detected by the first cooling water temperature sensor and the water temperature detected by the second cooling water temperature sensor for use in such a fault diagnosis for the thermostat, a fault of the thermostat can be diagnosed more correctly.

According to the present invention, the internal combustion engine includes a cooling device having a radiator and a cooling water passage configured to circulate cooling water between the internal combustion engine and the radiator. A fault diagnostic method for an internal combustion engine includes the steps of detecting a temperature of cooling water flowing in the internal combustion engine through the cooling water passage by a first cooling water temperature sensor, detecting a temperature of cooling water flowing in the radiator through the cooling water passage by a second cooling water temperature sensor, learning a difference between a detected value of the first cooling water temperature sensor and a detected value of the second cooling water temperature sensor when it is determined that the detected values of the first and second cooling water temperature sensors are stable while the internal combustion engine is at a stop, and performing a fault diagnosis for the internal combustion engine based on a temperature difference between the water temperature detected by the first cooling water temperature sensor and the water temperature detected by the second cooling water temperature sensor having been corrected through use of a learned value learned in the step of learning.

When the detected values of the first and second cooling water temperature sensors are stable while the internal combustion engine is at a stop, the temperature of cooling water in the cooling water passage becomes uniform. On this occasion, mismatch in detection characteristics between the sensors can be corrected by learning the difference between the detected values of the first and second cooling water temperature sensors. Therefore, according to this fault diagnostic method, the detected water temperatures having been corrected through use of the learned value can be used to improve accuracy in fault diagnosis for the internal combustion engine and restrain an erroneous diagnosis.

According to the present invention, a fault diagnostic system for an internal combustion engine and a fault diagnostic method for an internal combustion engine can be provided in which accuracy in fault diagnosis for the internal combustion engine can be improved and an erroneous diagnosis can be restrained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
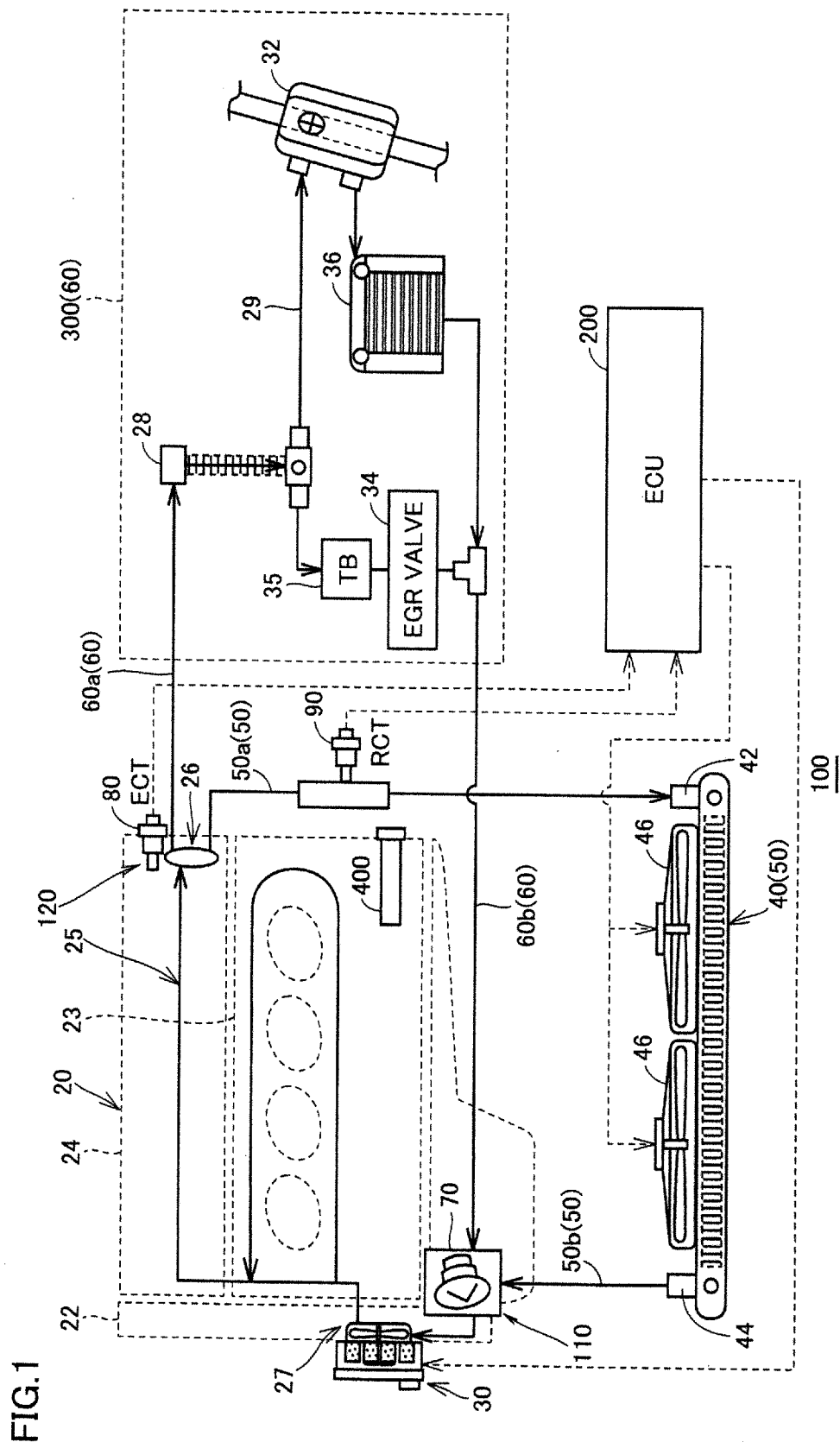
FIG. 1 is a schematic plan view describing a configuration of a vehicle including an engine according to a first embodiment of the present invention.

Hereinafter, embodiments of the present invention will be described in detail with reference to the drawings. In the drawings, the same or corresponding portions are denoted by the same reference characters and description thereof will not be repeated.

First Embodiment

FIG. 1 is a schematic plan view describing a configuration of a vehicle including an engine according to a first embodiment of the present invention. Referring to FIG. 1, a vehicle 100 includes an engine 20, an engine cooling device for cooling engine 20, and a fault diagnostic system diagnosing a fault of engine 20.

The engine cooling device includes a water jacket 24, a motor water pump (hereinafter, also referred to as a "motor pump") 30, a radiator 40, a radiator circulation passage 50, a bypass passage 60, and a thermostat 70. The fault diagnostic system includes an engine-side cooling water temperature sensor 80, a radiator-side cooling water temperature sensor 90, and a control device (hereinafter, also referred to as ECU (Electronic Control Unit)) 200.

Engine 20 has water jacket 24 for cooling engine 20 with cooling water. Water jacket 24 constitutes a water passage 25 formed around a cylinder of engine 20 and flowing cooling water. Water passage 25 is provided between an inlet 27 and an exit 26, along which cooling water from inlet 27 is discharged through exit 26. With heat exchange conducted between cooling water flowing through water passage 25 and engine 20, engine 20 is cooled. Accordingly, engine 20 is maintained at a temperature suitable for combustion. Water passage 25 and radiator circulation passage 50 constitute a "cooling water passage" according to the present invention.

Motor pump 30 is a pump driven by an electric motor to circulate cooling water of engine 20. Motor pump 30 is mounted on an attachment side part 22 of the engine body. Motor pump 30 pumps cooling water into water passage 25 through inlet 27.

Driving and stopping of motor pump 30 is controlled by a control signal received from ECU 200. Motor pump 30 is also controlled in discharge amount of cooling water pumped by motor pump 30 in response to a control signal received from ECU 200.

Exit 26 constitutes a branch part 120. Branch part 120 is connected to radiator circulation passage 50 and bypass passage 60. Cooling water from water passage 25 is divided by branch part 120 into cooling water to flow into radiator circulation passage 50 and cooling water to flow into bypass passage 60.

Radiator circulation passage 50 is a passage through which cooling water circulates among engine 20, motor pump 30 and radiator 40. Radiator circulation passage 50 includes pipes 50a, 50b and radiator 40. Pipe 50a is provided between branch part 120 and an inlet 42 of radiator 40. Pipe 50b is provided between exit 44 of radiator 40 and thermostat 70. Cooling water warmed by engine 20 is cooled by passing through radiator 40.

Radiator 40 performs heat exchange between cooling water flowing through radiator 40 and the outside air, thereby radiating heat of the cooling water. Radiator 40 is provided with a cooling fan 46. Cooling fan 46 promotes heat exchange by ventilation to improve efficiency in heat radiation of cooling water in radiator 40. Cooling water cooled in radiator 40 is discharged through exit 44.

Bypass passage 60 is a passage through which cooling water circulates bypassing radiator 40. Bypass passage 60 includes pipes 60a, 60b and a thermal apparatus 300. Pipe 60a is provided between branch part 120 and thermal apparatus 300. Pipe 60b is provided between thermal apparatus 300 and thermostat 70.

Thermal apparatus 300 includes an EGR (Exhaust Gas Recirculation) cooler 28, a pipe 29, an exhaust heat recovery unit 32, a heater 36, a throttle body 35, and an EGR valve 34.

EGR cooler 28 cools EGR gas with cooling water. Exhaust heat recovery unit 32 warms cooling water with the heat of exhaust gas, thereby increasing startability at low temperatures. Throttle body 35 is warmed with cooling water, so that occurrence of fixation or the like are prevented. EGR valve 34 is cooled with cooling water.

Thermostat 70 is disposed at a junction part 110 where cooling water having passed through radiator circulation passage 50 and cooling water having passed through bypass passage 60 join. Junction part 110 is connected to radiator 40 through pipe 50b and to pipe 60b. Cooling water from junction part 110 is returned to a suction port of motor pump 30.

Thermostat 70 adjusts the distribution of the amount of cooling water passing through both of radiator circulation passage 50 and bypass passage 60 in accordance with the temperature of cooling water. Thermostat 70 adjusts the mixing ratio of cooling water in the cooling passages to maintain the temperature of cooling water flowing through the engine cooling water passage so as to be a suitable temperature for engine 20.

Engine 20 has a block heater 400 for warming up engine 20. Block heater 400 is attached to a cylinder block 23 of engine 20. For example, in the case of using a vehicle under the condition where the outside air is lowered to very low temperatures in a cold region and the like, a cord of block heater 400 is plugged into a plug receptacle in a garage when parking the vehicle at the garage. Block heater 400 is thus powered on to generate heat. Heat generated by block heater 400 is transmitted through cylinder block 23 to warm cooling water within water jacket 24. Therefore, engine 20 will have been warmed up previously before the vehicle is started next time, which can improve startability of engine 20.

Engine-side cooling water temperature sensor 80 is provided for branch part 120. Engine-side cooling water temperature sensor 80 detects the temperature of cooling water discharged through exit 26, and outputs a detected value ECT to ECU 200. It is noted that engine-side cooling water temperature sensor 80 may be provided for a path along which cooling water always circulates, and for example, may be provided for water passage 25.

Radiator-side cooling water temperature sensor 90 is provided for pipe 50a. Radiator-side cooling water temperature sensor 90 detects the temperature of cooling water flowing through radiator circulation passage 50, and outputs a detected value RCT to ECU 200. It is noted that radiator-side cooling water temperature sensor 90 may be provided for radiator circulation passage 50, and for example, may be provided for pipe 50b.

ECU 200 performs a fault diagnosis for engine 20 based on detected value ECT received from engine-side cooling water temperature sensor 80 and detected value RCT received from radiator-side cooling water temperature sensor 90. As an example, the case where ECU 200 performs a fault diagnosis for thermostat 70 will be described below.

If the valve body of thermostat 70 is in the closed state while engine 20 is in the cold state, cooling water on the radiator circulation passage 50 side is prevented from flowing into water passage 25 by means of the valve body. On the other hand, cooling water on the bypass passage 60 side passes by the valve body to circulate through water passage 25. Therefore, only cooling water flown back from the bypass passage 60 side flows into water passage 25.

Thermostat 70 moves the valve body with rise in temperature of cooling water passing thereby. When thermostat 70 is opened with the movement of the valve body, cooling water circulating from the radiator circulation passage 50 side passes through thermostat 70 to be mixed with returned cooling water flown back from bypass passage 60.

In this manner, the mixing ratio of cooling water having a relatively low temperature flowing in from the radiator circulation passage 50 side having been cooled by radiator 40 to returned cooling water flown back from bypass passage 60 when they are mixed is controlled by the open/close state of the valve body of thermostat 70, so that the temperature of cooling water supplied to water passage 25 within water jacket 24 of engine 20 is adjusted to be an appropriate water temperature.

On the other hand, if thermostat 70 has failed, abnormalities, such as a closing failure in which the valve body is not opened even when the temperature of cooling water flowing therethrough rises and an opening failure in which the valve body is not closed even when the temperature of cooling water flowing therethrough is lowered, occur. In the state where such a failure occurs, cooling water having an appropriate water temperature cannot be supplied to water passage 25 of engine 20, which will lead to degraded operation efficiency of engine 20. It is therefore preferable to continuously perform fault diagnoses as to whether or not thermostat 70 is normally functioning to find a fault at an early stage.

In general, when the difference between detected value ECT and detected value RCT is small at a water temperature at which thermostat 70 is inherently not opened, it can be determined that thermostat 70 is in an opening failure assuming that thermostat 70 is open.

In the case where detection characteristics of engine-side cooling water temperature sensor 80 do not match detection characteristics of radiator-side cooling water temperature sensor 90, however, accuracy in fault diagnosis for engine 20 (e.g., fault diagnosis for thermostat 70) may be degraded. That is, if detected value ECT and detected value RCT are different from each other even though the temperature of cooling water in water passage 25 and the temperature of cooling water in radiator circulation passage 50, accuracy in fault diagnosis for engine 20 will be degraded due to the difference in detection characteristics between engine-side cooling water temperature sensor 80 and radiator-side cooling water temperature sensor 90.

In the present embodiment, when it is determined that detected value ECT and detected value RCT are stable while engine 20 is at a stop, the difference between detected value ECT and detected value RCT is calculated as a learned value. Then, a fault diagnosis for engine 20 is performed based on the difference between detected value ECT and detected value RCT having been corrected through use of the calculated learned value. It is noted that the state where detected value ECT and detected value RCT are stable refers to a state where the temperature of cooling water in water passage 25 and the temperature of cooling water in radiator circulation passage 50 are equal to the outside air temperature because of heat transfer. Hereinafter, this fault diagnosis processing will be described in detail.

Figure 2:
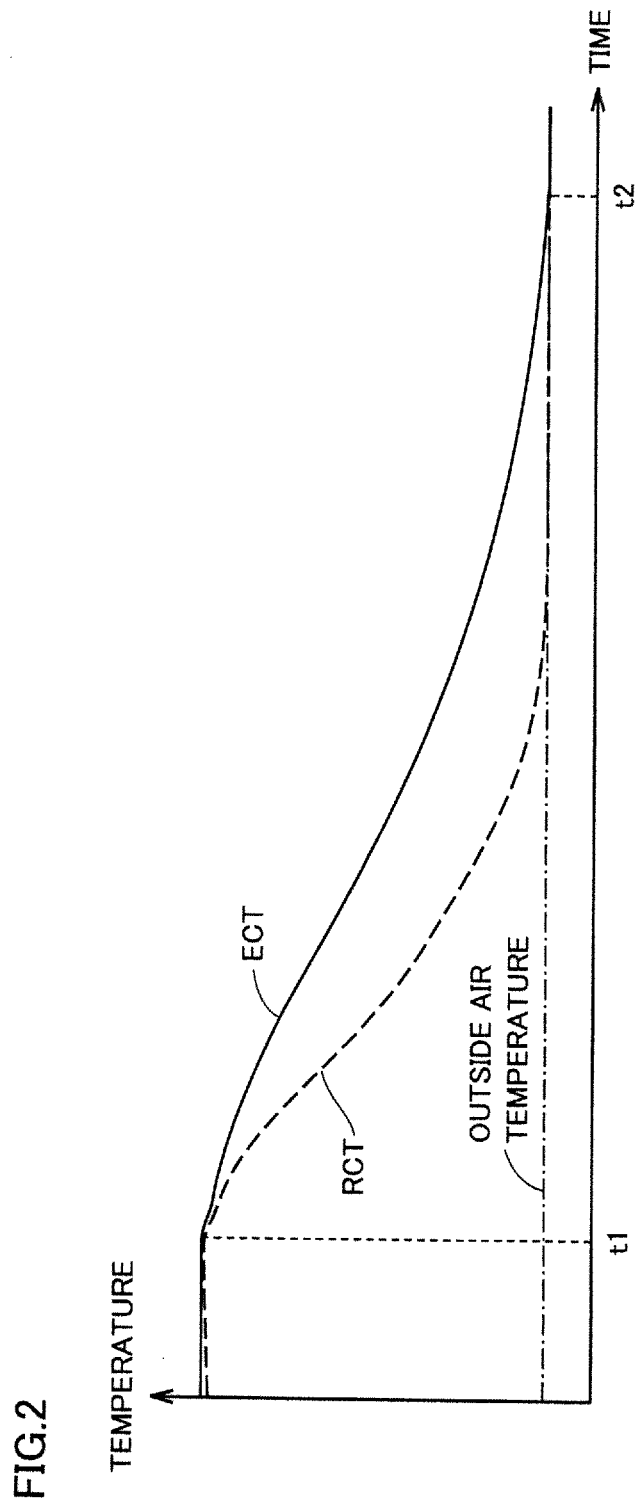
FIG. 2 is a time chart showing an example of time variation in respective detected values of an engine-side cooling water temperature sensor and a radiator-side cooling water temperature sensor after a stop of the engine.
Figure 3:
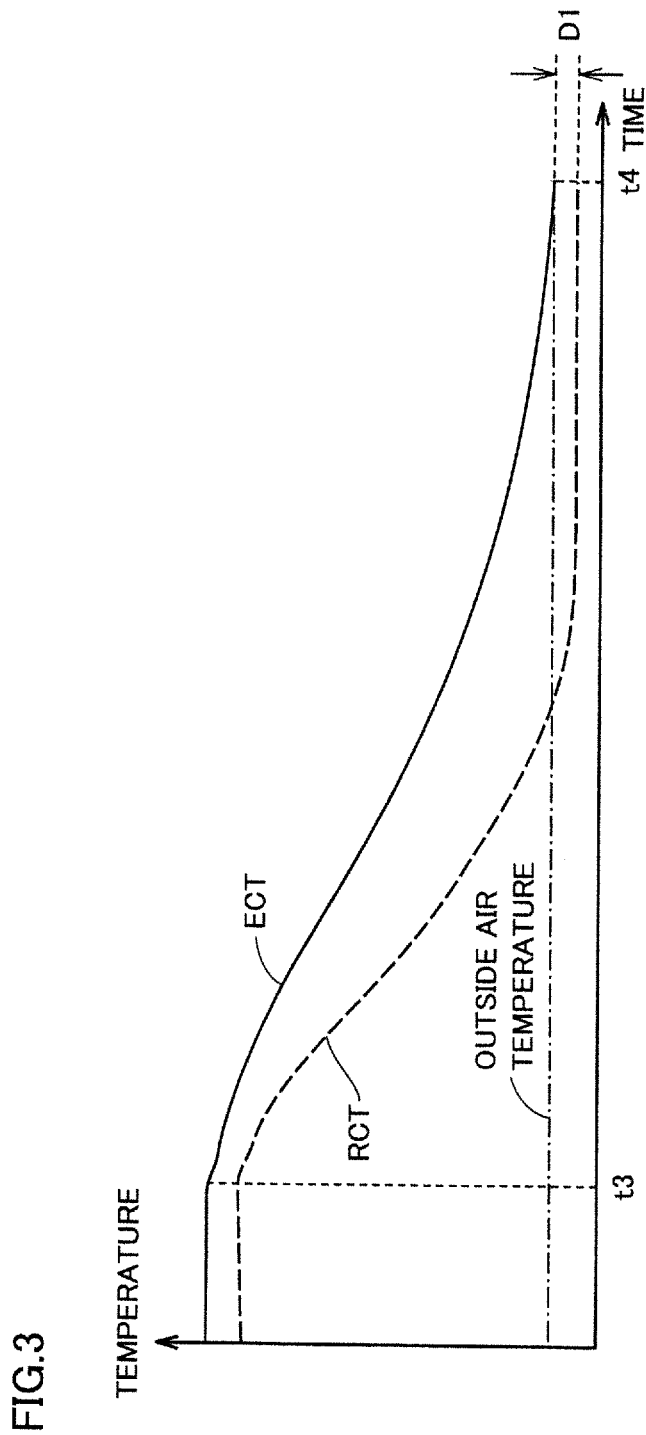
FIG. 3 is a time chart showing an example of time variation in respective detected values of an engine-side cooling water temperature sensor and a radiator-side cooling water temperature sensor after a stop of the engine.
Figure 4:
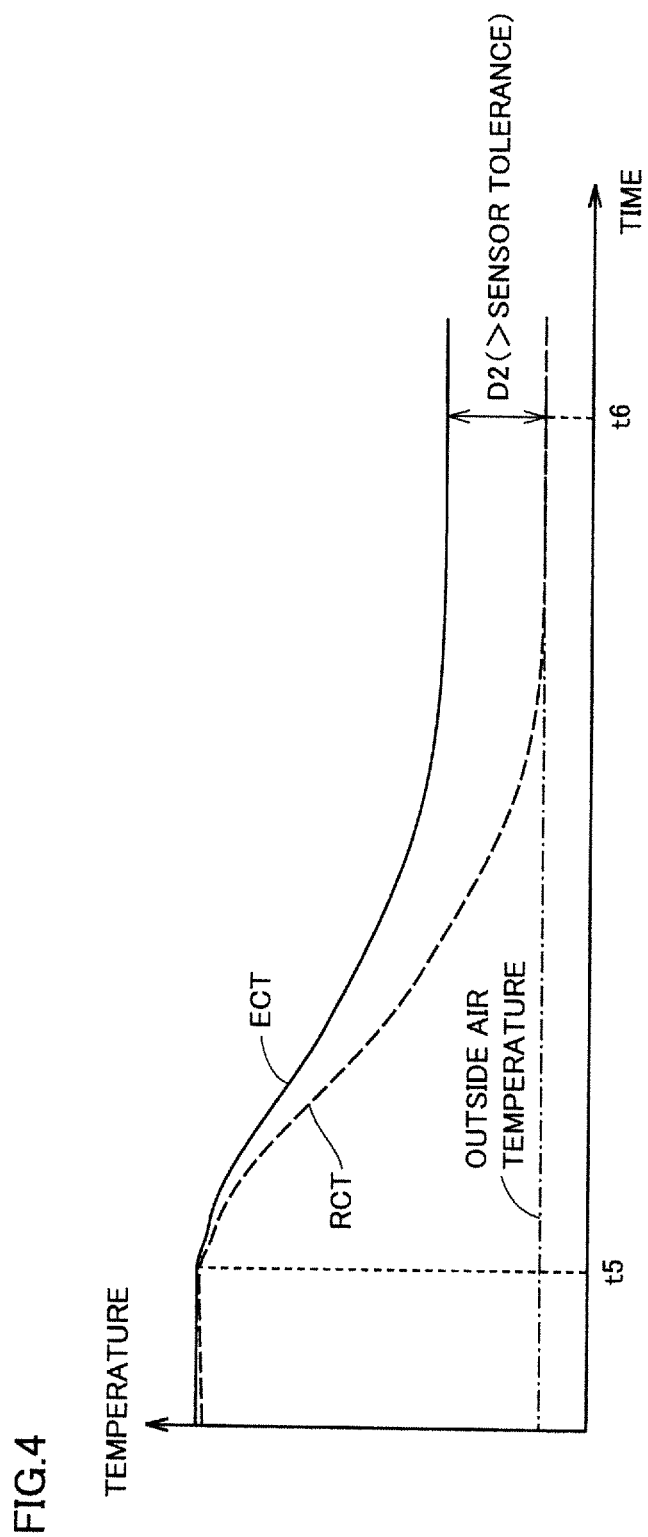
FIG. 4 is a time chart showing an example of time variation in respective detected values of an engine-side cooling water temperature sensor and a radiator-side cooling water temperature sensor after a stop of the engine.

FIGS. 2 to 4 are time charts each showing an example of time variations in respective detected values of engine-side cooling water temperature sensor 80 and radiator-side cooling water temperature sensor 90 after a stop of the engine. Referring to FIGS. 2 to 4, the horizontal axis indicates time, and the vertical axis indicates detected value ECT, detected value RCT and the outside air temperature. It is noted that detected value ECT is indicated by the solid line, detected value RCT is indicated by the broken line, and the outside air temperature is indicated by the alternate long and short dash line.

FIG. 2 shows a case where engine-side cooling water temperature sensor 80 and radiator-side cooling water temperature sensor 90 have identical detection characteristics. When engine 20 is stopped at time t1, heat of cooling water is radiated to the outside air. Thus, detected value ECT and detected value RCT gradually approach the outside air temperature. At time t2, detected value ECT and detected value RCT agree with the outside air temperature.

FIG. 3 shows a case where engine-side cooling water temperature sensor 80 and radiator-side cooling water temperature sensor 90 have different detection characteristics. When engine 20 is stopped at time t3, heat of cooling water is radiated to the outside air. Thus, detected value ECT and detected value RCT gradually approach the outside air temperature. However, a difference D1 has arisen at time t4 between detected value ECT and detected value RCT even though detected value ECT and detected value RCT have reached equilibrium.

Therefore, it can be determined that this difference D1 has arisen because of mismatch in detection characteristics between engine-side cooling water temperature sensor 80 and radiator-side cooling water temperature sensor 90. Accordingly, difference D1 is calculated as a learned value at time t4, and detected value ECT and detected value RCT are corrected through use of the calculated learned value, thereby performing a fault diagnosis for engine 20. Therefore, the exact state of engine 20 can be detected by means of detected water temperatures having been corrected, which can improve accuracy in fault diagnosis for engine 20 to restrain an erroneous diagnosis.

FIG. 4 shows a case where block heater 400 is operating after a stop of engine 20. When engine 20 is stopped at time t5, heat of cooling water is radiated to the outside air. Thus, detected value ECT and detected value RCT gradually approach the outside air temperature. However, a difference D2 has arisen at time t6 between detected value ECT and detected value RCT even though detected value ECT and detected value RCT have reached equilibrium. It is noted that difference D2 is a value more than a total value of a tolerance of the water temperature detected by engine-side cooling water temperature sensor 80 and a tolerance of the water temperature detected by radiator-side cooling water temperature sensor 90.

This is because engine 20 receives heat from block heater 400. That is, while block heater 400 is being used, only cooling water in water passage 25 is heated, and rises in temperature. Accordingly, if learning is executed in this case, the temperature difference will be erroneously learned. Therefore, in the case where it is determined that engine 20 is receiving heat from block heater 400, learning is not executed. The temperature difference can thereby be restrained from being erroneously learned, and a fault of engine 20 can be restrained from being erroneously diagnosed.

Figure 5:
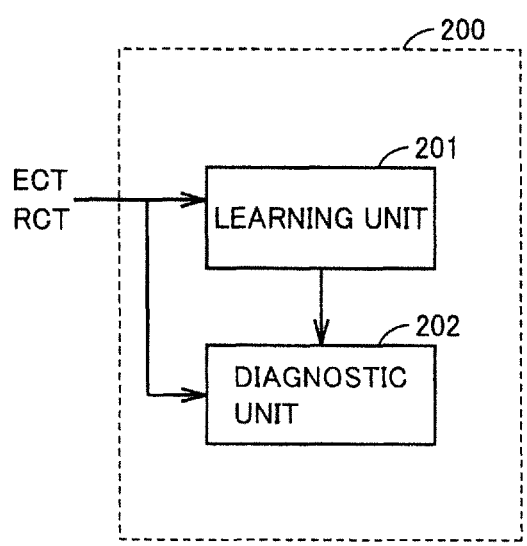
FIG. 5 is a functional block diagram related to a fault diagnosis for the engine executed by a control device shown in FIG. 1.

FIG. 5 is a functional block diagram related to a fault diagnosis for engine 20 executed by ECU 200 shown in FIG. 1. Each functional block shown in the functional block diagram of FIG. 5 is achieved by hardware-like or software-like processing by ECU 200.

Referring to FIG. 5, control device 200 includes a learning unit 201 and a diagnostic unit 202.

Learning unit 201 receives detected value ECT and detected value RCT. Learning unit 201 learns the difference between detected value ECT and detected value RCT when it is determined that detected value ECT and detected value RCT are stable while engine 20 is at a stop.

Learning unit 201 does not execute learning if the difference between detected value ECT and detected value RCT at the time when it is determined that detected value ECT and detected value RCT are stable while engine 20 is at a stop is more than a predetermined value. It is noted that the predetermined value is a value more than or equal to a total value of the tolerance of the water temperature detected by engine-side cooling water temperature sensor 80 and the tolerance of the water temperature detected by radiator-side cooling water temperature sensor 90. Learning unit 201 outputs the calculated learned value to diagnostic unit 202.

Diagnostic unit 202 receives detected value ECT and detected value RCT. Diagnostic unit 202 receives the learned value from learning unit 201. Diagnostic unit 202 performs a fault diagnosis for engine 20 based on the difference between detected value ECT and detected value RCT having been corrected through use of the learned value learned by the learning unit. Diagnostic unit 202 does not execute correction through use of the learned value if the difference between detected value ECT and detected value RCT after the completion of warming up of engine 20 is different from the learned value. Diagnostic unit 202 does not execute a fault diagnosis for engine 20 if the difference between detected value ECT and detected value RCT after the completion of warming up of engine 20 is different from the learned value.

As an example, diagnostic unit 202 can perform a fault diagnosis for thermostat 70 based on detected value ECT and detected value RCT having been corrected. Diagnostic unit 202 may also perform a fault diagnosis for engine-side cooling water temperature sensor 80 and radiator-side cooling water temperature sensor 90 based on detected value ECT and detected value RCT having been corrected.

Figure 6:
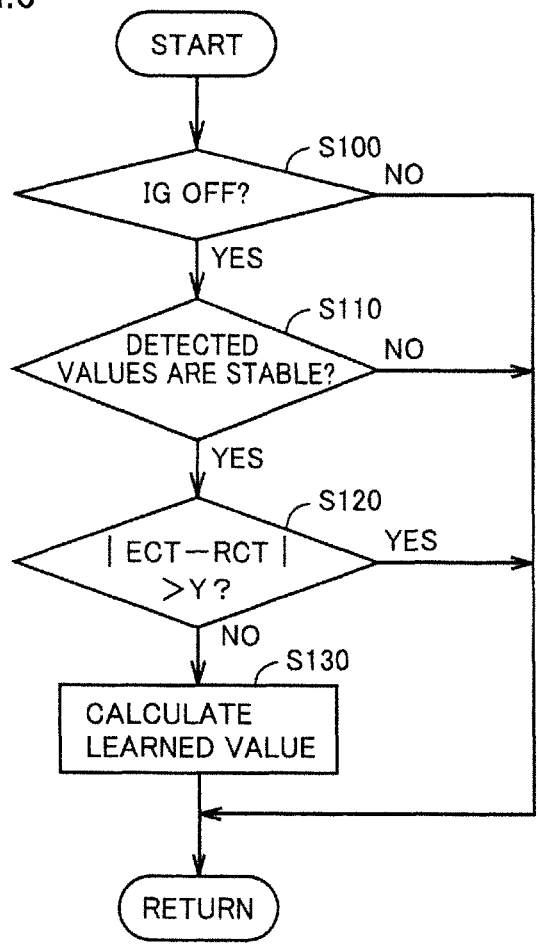
FIG. 6 is a flowchart of processing executed by a learning unit shown in FIG. 5.

FIG. 6 is a flowchart of processing executed by learning unit 201 shown in FIG. 5. The flowchart shown in FIG. 6 is achieved by execution of a program previously stored in ECU 200 at predetermined cycles. Alternatively, processing of some steps could be achieved by configuring dedicated hardware (an electronic circuit) (which also applies to the flowchart shown in FIG. 9 which will be described later).

Referring to FIG. 6, in step (hereinafter, step will be abbreviated to S) 100, learning unit 201 determines whether or not the vehicle is in an IG off state. It is noted that the IG off state refers to a state where vehicle 100 is not capable of running. When it is determined that the vehicle is not in the IG off state (NO in S100), the process is returned to the main routine skipping subsequent processing.

When it is determined that the vehicle is in the IG off state (YES in S100), learning unit 201 determines whether or not detected value ECT and detected value RCT are stable (S110). It is noted that learning unit 201 is capable of determining that detected value ECT and detected value RCT are stable when a predetermined time has elapsed since the stop of engine 20. It is noted that the predetermined time is a time period required until detected value ECT and detected value RCT become equal to the outside air temperature, for example.

Learning unit 201 may determine that detected value ECT and detected value RCT are stable when the rate of change in detected value ECT and detected value RCT is smaller than a predetermined rate of change. It is noted that the predetermined rate of change is a value at which detected value ECT and detected value RCT may be regarded as stable, for example.

When it is determined that detected value ECT and detected value RCT are not stable (NO in S110), the process is returned to the main routine skipping subsequent processing. When it is determined that detected value ECT and detected value RCT are stable (YES in S110), learning unit 201 determines whether or not the difference between detected value ECT and detected value RCT is more than a predetermined value Y (S120).

It is noted that predetermined value Y is a total value of the tolerance of the water temperature detected by engine-side cooling water temperature sensor 80 and the tolerance of the water temperature detected by radiator-side cooling water temperature sensor 90. Predetermined value Y may be a value more than a total value of the tolerance of the water temperature detected by engine-side cooling water temperature sensor 80 and the tolerance of the water temperature detected by radiator-side cooling water temperature sensor 90.

When it is determined that the difference between detected value ECT and detected value RCT is more than predetermined value Y (YES in S120), the process is returned to the main routine skipping subsequent processing. When it is determined that the difference between detected value ECT and detected value RCT is less than or equal to predetermined value Y (NO in S120), ECU 200 calculates the difference between detected value ECT and detected value RCT as a learned value (S130).

As described above, in this first embodiment, when the detected values of engine-side cooling water temperature sensor 80 and radiator-side cooling water temperature sensor 90 are stable while engine 20 is at a stop, the temperature of cooling water in the cooling water passage becomes uniform. On this occasion, mismatch in detection characteristics between the sensors can be corrected by learning the difference between detected value ECT and detected value RCT. Therefore, according to this first embodiment, the detected water temperatures having been corrected through use of the learned value can be used to improve accuracy in fault diagnosis for engine 20 and restrain an erroneous diagnosis.

Moreover, in this first embodiment, if the difference between the detected values is more than the predetermined value even though detected value ECT and detected value RCT are stable while engine 20 is at a stop, there is a possibility that disturbance due to the use of block heater 400 or the like has occurred. If learning is executed in this case, the difference between the detected values will be erroneously learned. Therefore, learning is not executed, so that erroneous learning can be restrained.

Furthermore, in this first embodiment, if the difference between the detected values is more than or equal to a total value of the tolerance of the water temperature detected by engine-side cooling water temperature sensor 80 and the tolerance of the water temperature detected by radiator-side cooling water temperature sensor 90 when detected value ECT and detected value RCT are stable while engine 20 is at a stop, the difference between the detected values has arisen for a reason other than mismatch in characteristics between the sensors. If learning is executed in this case, the difference between the detected values will be erroneously learned. Therefore, learning is not executed, so that erroneous learning can be reliably restrained.

Second Embodiment

In a second embodiment, a method for restraining a fault of engine 20 from being erroneously diagnosed in the case where a temperature difference has been erroneously learned will be described. It is noted that in the second embodiment, a diagnostic unit 202A is provided instead of diagnostic unit 202 of the first embodiment. The remaining configuration other than diagnostic unit 202A according to the second embodiment is similar to that of the first embodiment.

Figure 7:
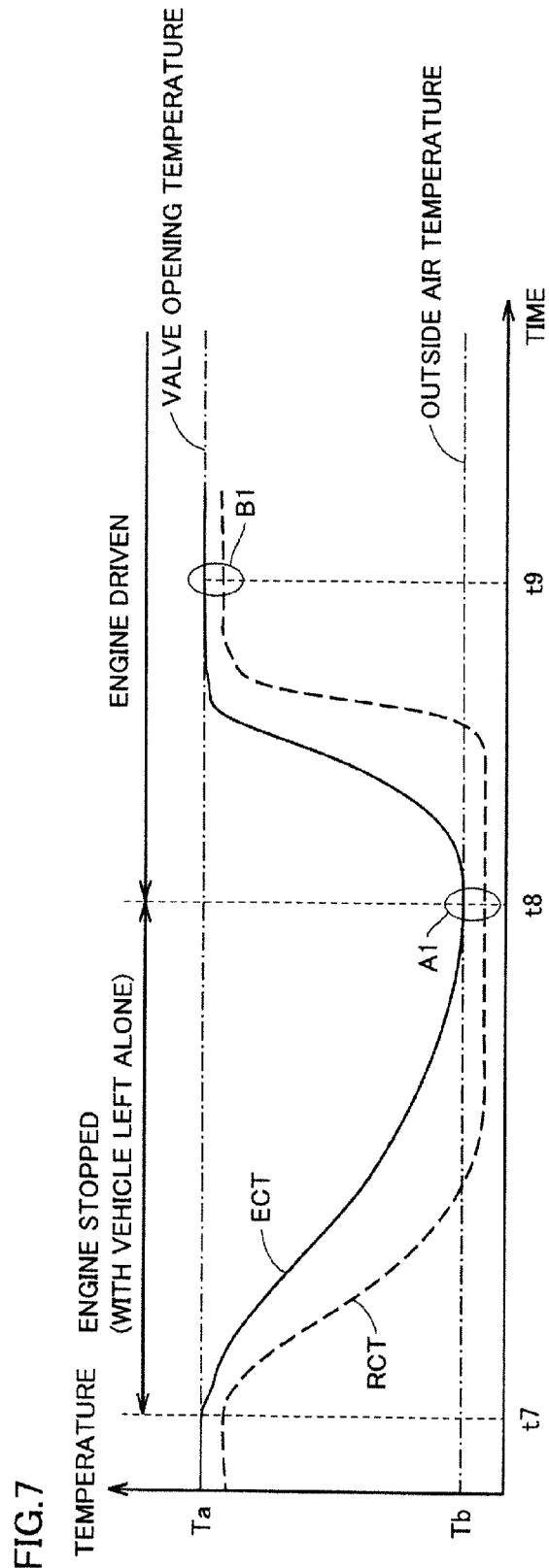
FIG. 7 is a time chart showing an example of time variation in respective detected values of the engine-side cooling water temperature sensor and the radiator-side cooling water temperature sensor between a stop of the engine and the completion of warming up of the engine.
Figure 8:
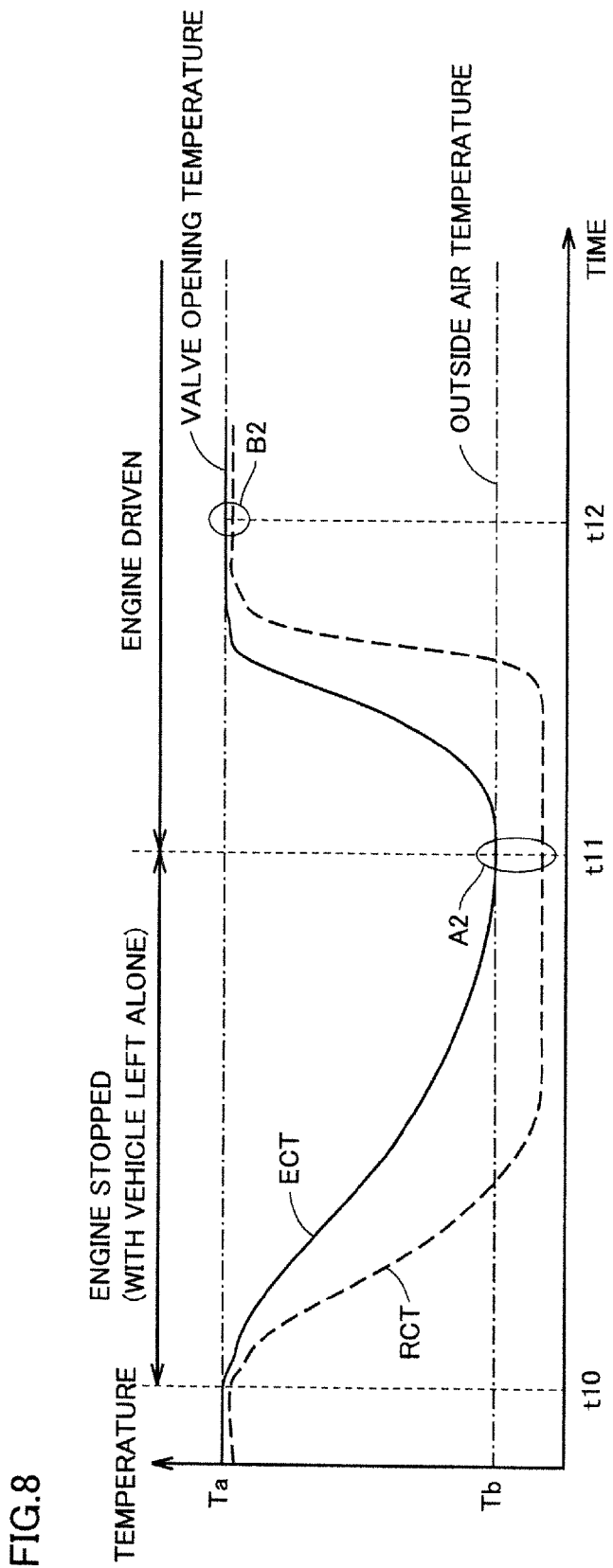
FIG. 8 is a time chart showing an example of time variation in respective detected values of the engine-side cooling water temperature sensor and the radiator-side cooling water temperature sensor between a stop of the engine and the completion of warming up of the engine.

FIGS. 7 and 8 are time charts each showing an example of time variations in the respective detected values of engine-side cooling water temperature sensor 80 and radiator-side cooling water temperature sensor 90 between a stop of the engine and the completion of warming up of the engine. Referring to FIGS. 7 and 8, the horizontal axis indicates time, and the vertical axis indicates detected value ECT, detected value RCT, outside air temperature, and valve opening temperature of thermostat 70. It is noted that detected value ECT is indicated by the solid line, detected value RCT is indicated by the broken line, and the outside air temperature and valve opening temperature of thermostat 70 are indicated by the alternate long and short dash lines.

FIG. 7 shows a case where mismatch in detection characteristics between engine-side cooling water temperature sensor 80 and radiator-side cooling water temperature sensor 90 has been learned correctly. When engine 20 is stopped at time t7, heat of cooling water is radiated to the outside air, so that detected value ECT and detected value RCT gradually approach the outside air temperature (with the vehicle left alone). At time t8, a temperature difference is learned after the lapse of a predetermined time since the stop of engine 20, and then, when engine 20 is brought into the driving state, detected value ECT and detected value RCT gradually increase.

At time t9, warming up of engine 20 is completed. Thermostat 70 attains a valve open state, and detected value ECT and detected value RCT reach equilibrium. Here, a difference A1 between detected value ECT and detected value RCT when learning of the temperature difference is executed at time t8 matches a difference B1 between detected value ECT and detected value RCT when warming up of engine 20 is completed at time t9.

FIG. 8 shows a case where mismatch in detection characteristics between engine-side cooling water temperature sensor 80 and radiator-side cooling water temperature sensor 90 has not been correctly learned. When engine 20 is stopped at time t10, heat of cooling water is radiated to the outside air, so that detected value ECT and detected value RCT gradually approach the outside air temperature (with the vehicle left alone). At time t11, a temperature difference is learned after the lapse of a predetermined time since the stop of engine 20, and then, when engine 20 is brought into the driving state, detected value ECT and detected value RCT gradually increase.

At time t12, when warming up of engine 20 is completed, detected value ECT and detected value RCT reach equilibrium. Here, a difference A2 between detected value ECT and detected value RCT when learning of the temperature difference is executed at time t11 does not match a difference B2 between detected value ECT and detected value RCT when warming up of engine 20 is completed at time t12.

In this case, there is a high possibility that the learned value has been calculated erroneously due to disturbance. Disturbance refers to, for example, a case where radiator-side cooling water temperature sensor 90 is warmed by sunlight, a case where radiator-side cooling water temperature sensor 90 is cooled with snow having entered the engine compartment, a case where block heater 400 is being used, and the like.

Therefore, if the temperature difference after the completion of warming up is different from the learned value, correction through use of the learned value is not executed, or a fault diagnosis for engine 20 is not executed. Accordingly, a fault of engine 20 can be restrained from being erroneously diagnosed even if the temperature difference has been learned erroneously.

Figure 9:
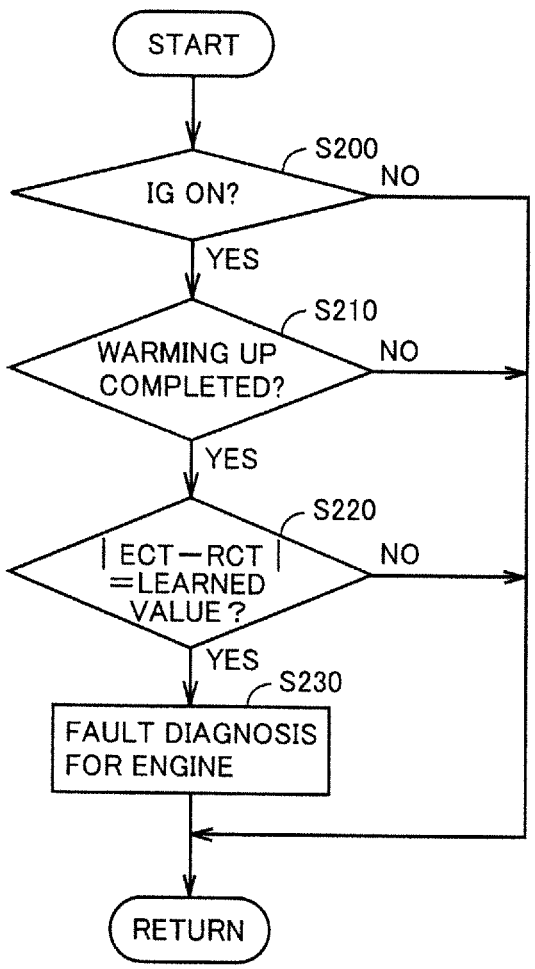
FIG. 9 is a flowchart of processing executed by a diagnostic unit 202A according to a second embodiment of the present invention.

FIG. 9 is a flowchart of processing executed by diagnostic unit 202A according to the second embodiment of the present invention. Referring to FIG. 9, in S200, diagnostic unit 202A determines whether or not the vehicle is in an IG on state. The IG on state refers to a state in which vehicle 100 is capable of running. When it is determined that the vehicle is not in the IG on state (NO in S200), the process is returned to the main routine skipping subsequent processing.

When it is determined that the vehicle is in the IG on state (YES in S200), diagnostic unit 202A determines whether or not warming up of engine 20 has been completed (S210). It is noted that diagnostic unit 202A can determine that warming up of engine 20 has been completed when the temperature of thermostat 70 becomes more than or equal to the valve opening temperature and detected value ECT and detected value RCT are stable. That is, diagnostic unit 202A can determine that warming up of engine 20 has been completed when detected value ECT and detected value RCT are stable with cooling water circulating between engine 20 and radiator 40 while engine 20 is operating.

When it is determined that warming up of engine 20 has not been completed (NO in S210), the process is returned to the main routine skipping subsequent processing. When it is determined that warming up of engine 20 has been completed (YES in S210), diagnostic unit 202A determines whether or not the difference between detected value ECT and detected value RCT matches the learned value (S220).

When it is determined that the difference between detected value ECT and detected value RCT matches the learned value (YES in S220), diagnostic unit 202A executes a fault diagnosis for engine 20 through use of the learned value (S230). On the other hand, when it is determined that the difference between detected value ECT and detected value RCT does not match the learned value (NO in S220), ECU 200A does not execute a fault diagnosis for engine 20.

It is noted that although the case where it is determined that block heater 400 is being used based on the difference between detected value ECT and detected value RCT has been described above, ECU 200A may determine that block heater 400 is being used based on information indicating the usage state of block heater 400.

As described above, in this second embodiment, a fault diagnosis for engine 20 is not executed if the difference between detected value ECT and detected value RCT is different from the learned value after the completion of warming up of engine 20. After the completion of warming up of engine 20, detected value ECT and detected value RCT become stable. If the difference between detected value ECT and detected value RCT after the completion of warming up of engine 20 is different from the learned value, there is a high possibility that the learned value has been calculated erroneously due to disturbance. Thus, a fault diagnosis for engine 20 is not executed. Accordingly, a fault of engine 20 can be restrained from being diagnosed through use of detected values erroneously learned.

Moreover, in this second embodiment, if the difference between detected value ECT and detected value RCT is different from the learned value after the completion of warming up of engine 20, correction through use of the learned value may not be executed. Similarly in this case, a fault of engine 20 can be restrained from being diagnosed through use of detected values erroneously learned.

It is noted that although the engine including a motor water pump has been described in the above-described embodiments, the present invention is also applicable to an engine having another type of pump. For example, a mechanical water pump driven by the engine can be used instead of the motor water pump.

It is noted that, in the above description, engine 20 corresponds to an embodiment of an "internal combustion engine" according to the present invention, and bypass passage 60 corresponds to an embodiment of a "return passage" according to the present invention. Engine-side cooling water temperature sensor 80 corresponds to an embodiment of a "first cooling water temperature sensor" according to the present invention, and radiator-side cooling water temperature sensor 90 corresponds to an embodiment of a "second cooling water temperature sensor" according to the present invention.

Although the embodiments of the present invention have been described, the embodiments are illustrative and non-restrictive in every respect. The scope of the present invention is defined by the claims, and is intended to include any modification within the meaning and scope equivalent to the terms of the claims.

What is claimed is:

1. A fault diagnostic system for an internal combustion engine,
the internal combustion engine including a cooling device having a radiator and a cooling water passage configured to circulate cooling water between the internal combustion engine and the radiator,
the fault diagnostic system comprising:
a first cooling water temperature sensor configured to detect a temperature of cooling water flowing in the internal combustion engine through the cooling water passage;
a second cooling water temperature sensor configured to detect a temperature of cooling water flowing in the radiator through the cooling water passage; and
a processor configured to:
learn a first temperature difference between a detected value of the first cooling water temperature sensor and a detected value of the second cooling water temperature sensor at a first time when it is determined that the detected values of the first and second cooling water temperature sensors are stable while the internal combustion engine is at a stop;
at a second time after the first time, determine a corrected temperature difference between a water temperature detected by the first cooling water temperature sensor and a water temperature detected by the second cooling water temperature sensor, wherein the corrected temperature difference is determined through use of the first temperature difference; and
perform a fault diagnosis for the internal combustion engine based on the corrected temperature difference.

2. The fault diagnostic system for an internal combustion engine according to claim 1, wherein the processor is configured to learn the first temperature difference only if the first temperature difference is less than or equal to a predetermined value when it is determined that the detected values of the first and second cooling water temperature sensors are stable while the internal combustion engine is at a stop.

3. The fault diagnostic system for an internal combustion engine according to claim 2, wherein the predetermined value is a total value of a tolerance of the detected value of the first cooling water temperature sensor and a tolerance of the detected value of the second cooling water temperature sensor.

4. The fault diagnostic system for an internal combustion engine according to claim 1, wherein after completion of warming up of the internal combustion engine, the processor is configured to determine the corrected temperature difference through use of the first temperature difference only if a second temperature difference between the water temperature detected by the first cooling water temperature sensor at the second time and the water temperature detected by the second cooling water temperature sensor at the second time is equal to the first temperature difference.

5. The fault diagnostic system for an internal combustion engine according to claim 4, wherein in a state where the cooling water is circulating between the internal combustion engine and the radiator while the internal combustion engine is operating, the processor is configured to determine the corrected temperature difference through use of the first temperature difference only if a second temperature difference between the water temperature detected by the first cooling water temperature sensor at the second time and the water temperature detected by the second cooling water temperature sensor at the second time is equal to the first temperature difference when it is determined that the water temperatures detected by the first and second cooling water temperature sensors are stable.

6. The fault diagnostic system for an internal combustion engine according to claim 1, wherein after completion of warming up of the internal combustion engine, the processor is configured to perform the fault diagnosis for the internal combustion engine only if a second temperature difference between the water temperature detected by the first cooling water temperature sensor at the second time and the water temperature detected by the second cooling water temperature sensor at the second time is equal to the first temperature difference.

7. The fault diagnostic system for an internal combustion engine according to claim 6, wherein in a state where the cooling water is circulating between the internal combustion engine and the radiator while the internal combustion engine is operating, the processor is configured to perform the fault diagnosis for the internal combustion engine only if a second temperature difference between the water temperature detected by the first cooling water temperature sensor at the second time and the water temperature detected by the second cooling water temperature sensor at the second time is equal to the first temperature difference when it is determined that the water temperatures detected by the first and second cooling water temperature sensors are stable.

8. The fault diagnostic system for an internal combustion engine according to claim 1, wherein
the cooling water passage further includes:
a water passage provided for the internal combustion engine and configured to flow cooling water;
a radiator circulation passage configured to flow cooling water to the radiator;
the cooling device further includes:
a return passage configured to flow returned cooling water from the water passage of the internal combustion engine back to the water passage of the internal combustion engine without passing through the radiator;
a junction part configured such that the radiator circulation passage and the return passage join at an inlet side of the internal combustion engine; and
a thermostat provided for the junction part and configured to adjust a mixing ratio between the cooling water flowing in the radiator circulation passage and the returned cooling water in accordance with the temperature of cooling water at the junction part, and
the processor is configured to perform a fault diagnosis for the thermostat based on the corrected temperature difference.

9. A fault diagnostic method for an internal combustion engine, the fault diagnostic method being performed by a controller,
the internal combustion engine including a cooling device having a radiator and a cooling water passage configured to circulate cooling water between the internal combustion engine and said radiator,
the fault diagnostic method comprising the steps of:
detecting a temperature of cooling water flowing in the internal combustion engine through the cooling water passage by a first cooling water temperature sensor;
detecting a temperature of cooling water flowing in the radiator through the cooling water passage by a second cooling water temperature sensor;
learning a first temperature difference between a detected value of the first cooling water temperature sensor and a detected value of the second cooling water temperature sensor at a first time when it is determined that the detected values of the first and second cooling water temperature sensors are stable while the internal combustion engine is at a stop;
at a second time after the first time, determining a corrected temperature difference between a water temperature detected by the first cooling water temperature sensor and a water temperature detected by the second cooling water temperature sensor, wherein the corrected temperature difference is determined through use of the first temperature difference; and
performing a fault diagnosis for the internal combustion engine based on the corrected temperature difference.

* * * * *